M. BRESLAUER.
DYNAMO ELECTRIC GEAR OF THE UNIPOLAR TYPE.
APPLICATION FILED NOV. 11, 1915.
1,184,224.
Patented May 23, 1916.
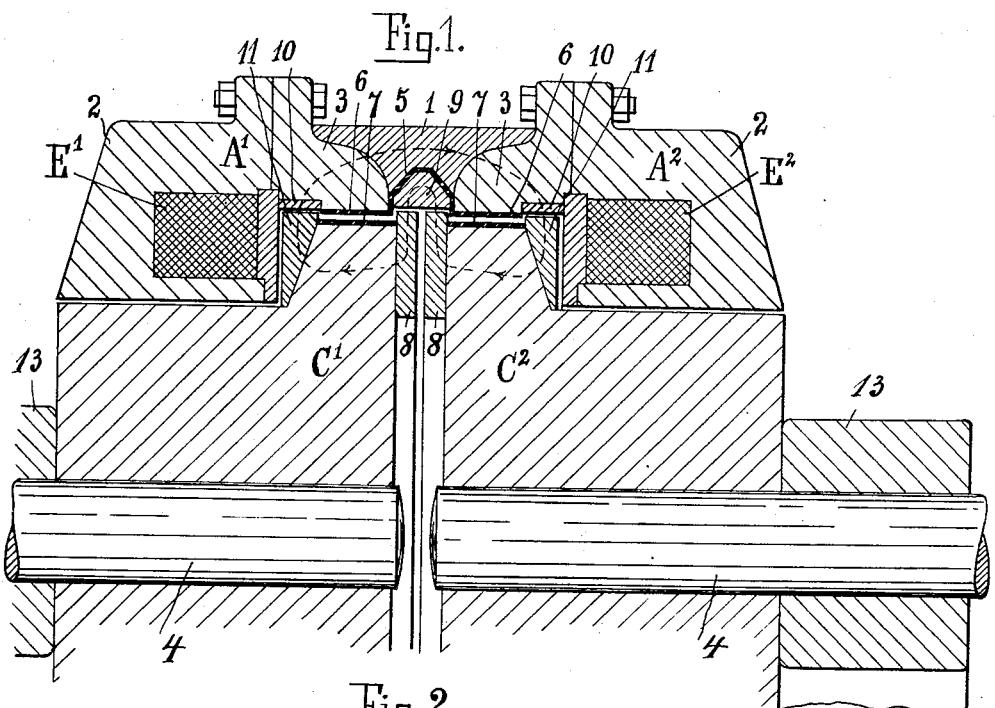
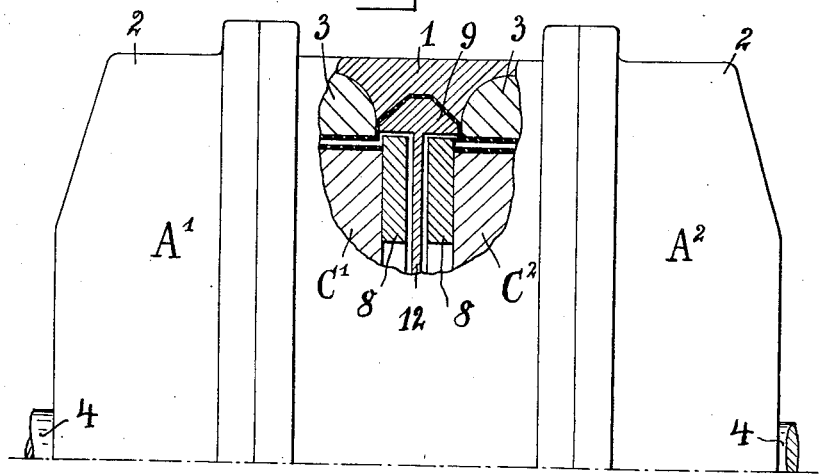
M. Breslauer.
Inventor.
By G. Bragdon Marks
Attorney.

UNITED STATES PATENT OFFICE.

MAX BRESLAUER, OF HOPPEGARTEN, NEAR BERLIN, GERMANY.

DYNAMO-ELECTRIC GEAR OF THE UNIPOLAR TYPE.

1,184,224. Specification of Letters Patent. Patented May 23, 1916.

Application filed November 11, 1915. Serial No. 60,899.

*To all whom it may concern:*

Be it known that I, MAX BRESLAUER, a subject of the German Emperor, residing at Hoppegarten, near Berlin, Germany, have invented certain new and useful Improvements in Dynamo-Electric Gear of the Unipolar Type; and I do hereby declare the following to be a full, clear, and exact description of the invention, such as will enable others skilled in the art to which it appertains to make and use the same.

In the known dynamo-electric gears, consisting of two separate unipolar machines running as generator and motor, respectively, the stators of which are combined to a common housing inclosing the rotors, some difficulty is experienced in limiting the mercury forming the electric connections between the rotors themselves and with the stators to the current passage surfaces because the air gap which is in a plane at right angles to the shaft must be filled with mercury between the opposing faces of the rotors of the two machines, in order to form a passage for the current between these parts.

According to the present invention an intermediate conductor of a ring shape has, for the purpose of forming a passage for the current from one rotor to the other, been insulatedly fitted into the shell of the housing opposite to the circumferential surfaces of the current passage parts of the rotors. With such arrangement, it will be sufficient if there is mercury only between the opposing circumferential surfaces of the current passage parts and the intermediate conductor.

In the accompanying drawing Figure 1 is a section through the upper portion of a constructional form of the improved gear; Fig. 2 shows a modified detail.

In the gearing according to Fig. 1 the stators $A^1$, $A^2$ of the two machines, which are composed each of two iron rings 2, 3 attached to each other, are combined to a housing with a copper ring 1 interposed between them. In this common housing the rotors $C^1$, $C^2$ which are with their face surfaces immediately opposite each other, are journaled on shafts 4 supported in bearings 13. On the opposed faces of the two rotors copper rings or flanges 8 for transmitting the current are provided projecting radially. Opposite the circumferential surfaces of these rings a beveled copper ring 9 is sunk into the stator housing, the axial dimension of which ring 9 is such, that its cylindrical inside surface extends all over the circumferential surfaces of the rings 8. The ring 9 is electrically insulated from the copper ring 1 and the iron rings 3 of the stators by an insulation 5. At the outer ends the stator rings 3 are provided, on their inner side, with sunk copper facings 10, opposite to which are the faces of copper rings 11 of a tapered section, which are attached to the rotors $C^1$, $C^2$ and project radially therefrom. The surfaces of the stator rings 3, and of the rotors $C^1$, $C^2$ between rings 9, 10 and 8, 11 are covered with insulating material 6 and 7, respectively. The rings 1, 10 and 11 are conductively connected with the stators and the rotors, respectively, for example by soldering or fusing. The exciting windings $E^1$, $E^2$ are disposed in the stator rings 2.

Into the stator housing an amount of mercury is introduced, which is so great that, when the gearing revolves, the mercury will, by the centrifugal force, fill the annular grooves formed by the slightly sunk arrangement of the rings 9 and 10, so that the rings 8 and 11 will, with their circumference, dip into the mercury. In consequence thereof the path of the current indicated by the dotted arrow line is formed, the current passing from the copper ring 8 of the rotor $C^2$ over the copper ring 9 sunk into the stator body to the copper ring 8 of the rotor $C^1$, whereupon after passing through this rotor it passes from the copper ring 11 to the copper facing 10 of ring 3 of the stator $A^1$, through the copper ring 1 into the ring 3 of the stator $A^2$ and thence through the rings 10 and 11 back to the rotor $C^2$. In place of the insulations 6, 7 also oxid coatings or films may, with smaller types, be employed, such films being, for example, produced by the known browning process.

In the constructional form according to Fig. 2 a partition 12 is provided in combination with the current passage ring 9 fitted into the housing, the said partition separating the two rotors $C^1$, $C^2$. It is thereby obtained that the movement of the mercury in the one half of the gearing is entirely independent from that in the other half, what may be of importance particularly in plants where the speed on the motor side and the generator side, respectively, differs, because otherwise, in consequence of the differences in the speed, eddying and other non-controllable effects might occur in the movement of the mercury and its distribution over the various current passage parts. The intermediate partition 12 need not extend down to the axis of the gearing, as its object is less that of producing separate housing chambers, than that of forming separate contact ring chambers for the two rotor rings 8.

I claim:

1. A dynamo-electric gear composed of two unipolar machines with stators combined to form a common housing, independent rotors in said housing, and means for electrically connecting said rotors, said means comprising an intermediary conductor ring.

2. A dynamo-electric gear composed of two unipolar machines with stators combined to form a common housing, independent rotors in said housing, circumferential annular conducting surfaces on said rotors, a conductor ring opposite said annular surfaces, and means to electrically connect said annular surfaces and conductor ring.

3. A dynamo-electric gear composed of two unipolar machines with stators combined to form a common housing, independent rotors in said housing, circumferential annular conducting surfaces on said rotors, a conductor ring opposite said annular surfaces, said ring being insulatedly fitted into the stator housing, and means to electrically connect said annular surfaces and conductor ring.

4. A dynamo-electric gear composed of two unipolar machines with stators combined to form a common housing, independent rotors in said housing, said rotors having radially projecting flanges, a conductor ring insulatedly fitted into the stator housing opposite the circumferential surfaces of said flanges, and means to electrically connect said flanges and conductor ring.

5. A dynamo-electric gear composed of two unipolar machines with stators combined to form a common housing, independent rotors in said housing, radially projecting copper rings on the inner ends of said rotors, a conductor ring insulatedly fitted into the stator housing opposite the circumferential surfaces of said copper rings, and means to electrically connect said copper rings and conductor ring.

6. A dynamo-electric gear composed of two unipolar machines with stators combined to form a common housing, independent rotors in said housing, circumferential annular conducting surfaces on said rotors, a conductor ring opposite said annular surfaces, and a liquid conductor between said annular surfaces and conductor ring.

7. A dynamo-electric gear composed of two unipolar machines with stators combined to form a common housing, independent rotors in said housing, a conductor ring insulatedly sunk into the stator housing so as to form an annular groove, said rotors having flanges radially projecting into said groove, and a liquid conductor adapted to fill said groove under the influence of centrifugal force to such an extent that the flanges of the rotor will dip into it.

8. A dynamo-electric gear composed of two unipolar machines with stators combined to form a common housing, independent rotors in said housing, a conductor ring insulatedly sunk into the stator housing, a partition in connection with said conductor ring, said rotor having flanges radially projecting into the annular grooves formed by said sunk ring and partition, and a liquid conductor adapted to fill said grooves under the influence of centrifugal force to such an extent that the flanges of the rotor will dip into it.

In testimony whereof, I have affixed my signature in presence of two witnesses.

MAX BRESLAUER.

Witnesses:
　HENRY HASPER,
　ARTHUR SCHROEDER.